US007599837B2

(12) United States Patent
Wang et al.

(10) Patent No.: US 7,599,837 B2
(45) Date of Patent: Oct. 6, 2009

(54) CREATING A SPEECH RECOGNITION GRAMMAR FOR ALPHANUMERIC CONCEPTS

(75) Inventors: Ye-Yi Wang, Redmond, WA (US); Yun-Cheng Ju, Bellevue, WA (US); Leonard Alan Collins, Carnation, WA (US); Mark Cecys, Woodinville, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/941,439

(22) Filed: Sep. 15, 2004

(65) Prior Publication Data

US 2006/0069547 A1 Mar. 30, 2006

(51) Int. Cl.
*G10L 15/00* (2006.01)
*G10L 15/18* (2006.01)
(52) U.S. Cl. .................... 704/257; 704/231; 704/255
(58) Field of Classification Search .................. None
See application file for complete search history.

(56) References Cited

U.S. PATENT DOCUMENTS

| | | | |
|---|---|---|---|
| 5,642,519 A | 6/1997 | Martin et al. | |
| 6,389,394 B1 * | 5/2002 | Fanty | 704/249 |
| 6,973,429 B2 * | 12/2005 | Smith | 704/257 |
| 7,120,582 B1 * | 10/2006 | Young et al. | 704/255 |

2003/0050772 A1   3/2003   Bennett

OTHER PUBLICATIONS

R. Pieraccini and E. Levin, "A Learning Approach to Natural Language Understanding." In the Proceedings of 1993 NATO ASI Summer School, Bubion, Spain, 1993.
S. Miller, R. Bobrow, R. Ingria, and R. Schwartz, "Hidden Understanding Models of Natural Language." In the Proceedings of the 31st Annual Meeting of the Association for Computational Linguistics, New Mexico State University, 1994.
Y.-Y. Wang and A. Acero, "Combination of CFG and N-gram Modeling in Semantic Grammar Learning." In the Proceedings of Eurospeech 2003, Geneva, Switzerland, 2003.
J. Glass and E. Weinstein, "SpeechBuilder: Facilitating Spoken Dialogue System Development." In the Proceedings of Eurospeech 2001, Aalborg, Denmark, 2001.
XML XML Schema Part 2 Datatypes, published as W3C Recommendations, http://www.w3.org/trsmlschema-2/, May 2001.
European Search Report of the European Patent Office Patent Office in counterpart foreign application No. 05107947.3 filed Aug. 31, 2005.
Moore RC et al, CommandTalk: A Spoken-Language Interface for Battlefield Simulations, Fifth Conference on Applied Natural Language Processing, Association for Computational Linguistics, Online!, Mar. 31, 1997, pp. 1-7.
Wang Y et al, Creating speech recognition grammars from regular expressions for alphanumeric concepts, Proc ICSLP 2004 JEJU, South Korea, Online! Oct. 2004.
Y. He and S. Young, "Hidden Vector State Model for Hierarchical Semantic Parsing." In the Proceedings of ICASSP 2003, Hong Kong, China, 2003.

* cited by examiner

*Primary Examiner*—David R Hudspeth
*Assistant Examiner*—Samuel G Neway (57) ABSTRACT

A method and system to generate a grammar adapted for use by a speech recognizer includes receiving a representation of an alphanumeric expression. For instance, the representation can take the form of a regular expression or a mask. The grammar is generated based on the representation.

20 Claims, 4 Drawing Sheets

CREATING A SPEECH RECOGNITION GRAMMAR FOR ALPHANUMERIC CONCEPTS

BACKGROUND OF THE INVENTION

The present invention relates to speech recognition. More particularly, the present invention relates to automatically creating a speech recognition grammar for alphanumeric concepts.

Speech recognition systems are increasingly being used by companies and organizations to reduce cost, improve customer service and/or automate tasks completely or in part. Such systems have been used on a wide variety of computing devices ranging from stand alone desktop machines, network devices and mobile handheld computing devices. Speech recognition provides a natural user interface for application developers. For instance, for computing devices such as handheld mobile devices, complete alpha-numeric keyboards are impractical without significantly increasing the size of the computing device. Speech recognition thus provides a convenient input methodology for small devices and also allows the user to access a computer remotely such as through a simple telephone.

With speech recognition being more widely accepted if not required, there is a need to create flexible, accurate, speech-enabled applications quickly and efficiently. Research directed to spoken language understanding models has achieved flexibility because such systems allow mixed-initiative dialogs between the system and the user. While such systems and research has achieved accuracy at modeling the commands that contain multiple phrasal semantic units (slots), for example, a "ShowFlight" command like "List the flights from Seattle to Boston on Tuesday that costs no more than $400" in the domain of Air Travel Information System, they seldom studied the acquisition of the phrasal model for the low level concepts like date, time, credit card number, flight number, etc. Instead, they resorted to grammar libraries and database entries (e.g., city names from an application database) for solutions.

Nevertheless, a majority of the spoken language systems deployed so far are system-initiative, directed dialog systems. In such systems, most of the grammar development efforts are devoted to the low level concepts. While the grammar libraries and database entries are viable solutions, they did not solve the problem completely. For instance, the grammar library developers cannot foresee all possible domain specific concepts and pre-build grammars for them. In addition, the orthographic form of the database entries are often not sufficient to serve as the speech recognition grammar. For example, a proper speech recognition grammar needs to model a variety of alternative spoken expressions for an alphanumeric string. Suppose an application needs to recognize parts numbers and that "ABB123" is one of the parts numbers. The speech enabled system should be able to recognize this part number even if it is spoken in different ways such as "A B B one two three" or "A double B one twenty three."

Accordingly, it is well-recognized that grammar development for the alphanumeric concepts like parts number and driver license numbers is one of the most challenging tasks. One attempt has been to employ a simple grammar based on a single state finite state model. Such a model has a loop for each character (A-Z) and each digit (0-9). However, the model generally does not work well for reasons including that the grammar does not capture the specificity of the target sub-languages. Therefore, the perplexity of the model is much higher than it should be. For example, if it is known that the parts number always starts with letter "B", the grammar should explicitly model the constraint so that recognition errors that confuse "E" with "D", "E", "G", and "P" will never occur.

In addition, the simple grammar does not model the diversity of linguistic expressions for many types of strings. In the example above, both portion "ABB" and portion "123" of "ABB123" can be provided in different yet very common ways, many of which are not modeled by the simple grammar.

Furthermore, special characters like "-", "*", etc. often appear in the alphanumeric sequences like parts numbers. This would require that the general alphanumeric grammar be customized in such cases.

In view of the foregoing problems, developers are often forced to write their own grammar for specific alphanumeric concepts. The process is tedious and error-prone. Unlike the grammar library, the grammars authored by the less experienced developers are often not optimized, thus have poor performance when used by a decoder.

A system or method for generating an alphanumeric grammar that addresses one, some or all of the foregoing needs would thus be beneficial.

SUMMARY OF THE INVENTION

A method and system to generate a grammar adapted for use by a speech recognizer includes receiving a representation of an alphanumeric expression. For instance, the representation can take the form of a regular expression or a mask. The grammar is generated based on the representation. In this manner, a developer can provide, for example, a regular expression for the alphanumeric expression and the system automatically constructs the grammar.

In further embodiments, the grammar can be adapted to alternative character spoken expressions (e.g. "zero" or "oh", which both can by uttered for "0"), and/or rules for recognition of alternative character sequence spoken expressions (e.g. "A A" or "double A", which both can be uttered for "AA"). In such cases, the grammar can also be modified to provide normalization information so that a normalized output can be outputted by a speech recognizer using the grammar. In yet a further embodiment, the grammar is constructed with prefix optimization.

While the quality of the grammar is ultimately determined by the way in which the representation is provided, the method and system described herein relieves the developers from the difficult tasks of grammar development, particular for alphanumeric expressions that may be unique to a particular application. In this manner, grammars for alphanumeric expressions can be developed faster and without the unique expertise of grammar developers.

DETAILED DESCRIPTION OF ILLUSTRATIVE EMBODIMENTS

The present invention relates to a system, modules and a method for generating a grammar for alphanumeric concepts or expressions. However, prior to discussing the present invention in greater detail, one illustrative environment in which the present invention can be used will be discussed first.

Exemplary Operating Environment

Figure 1:
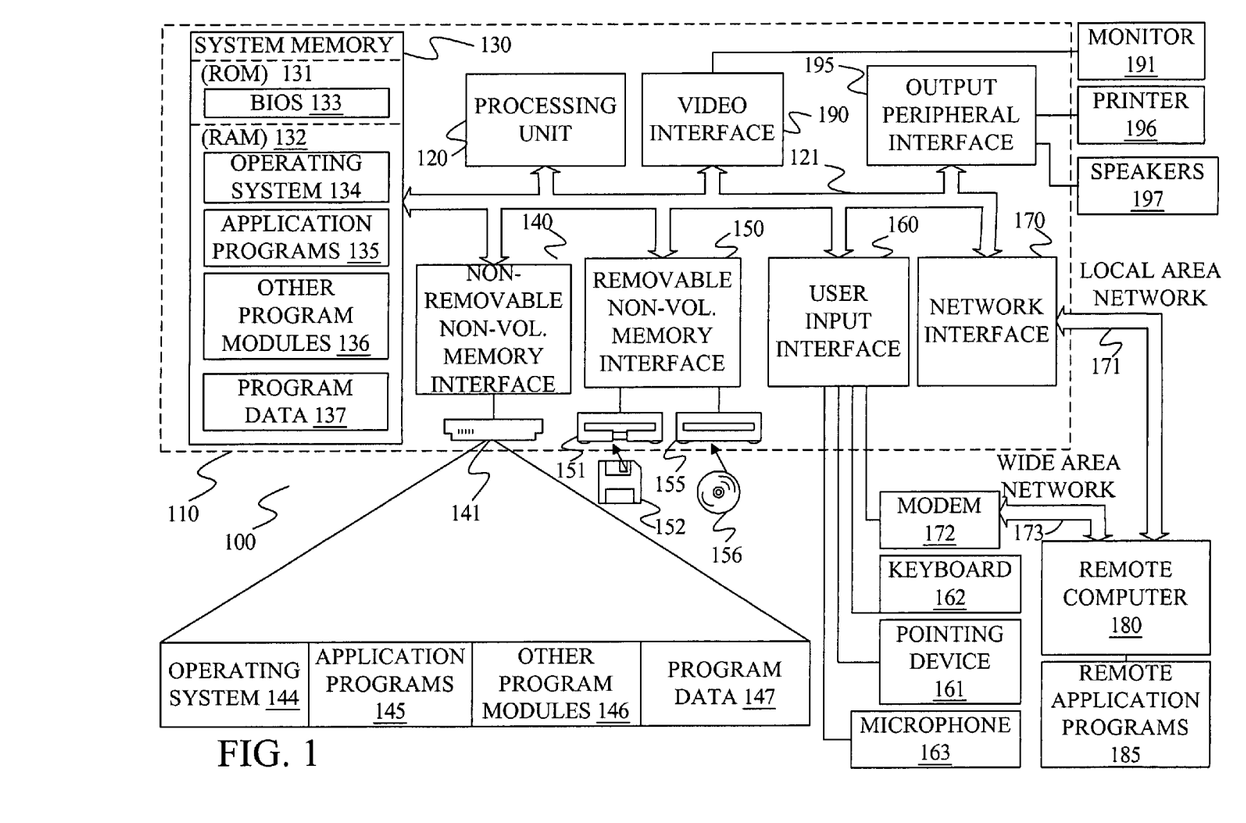
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Grammar Generating System

As indicated above, an aspect of the present invention includes a system and a method for enabling developers with little grammar authoring experience to construct high performance speech grammars for alphanumeric concepts or expressions such as parts numbers, drivers licenses, and the like. These types of expression are present in many types of applications; however, the expressions are generally unique to the application, and thus less likely to be pre-built in a library grammar that is to be used across many types of applications.

Figure 2:
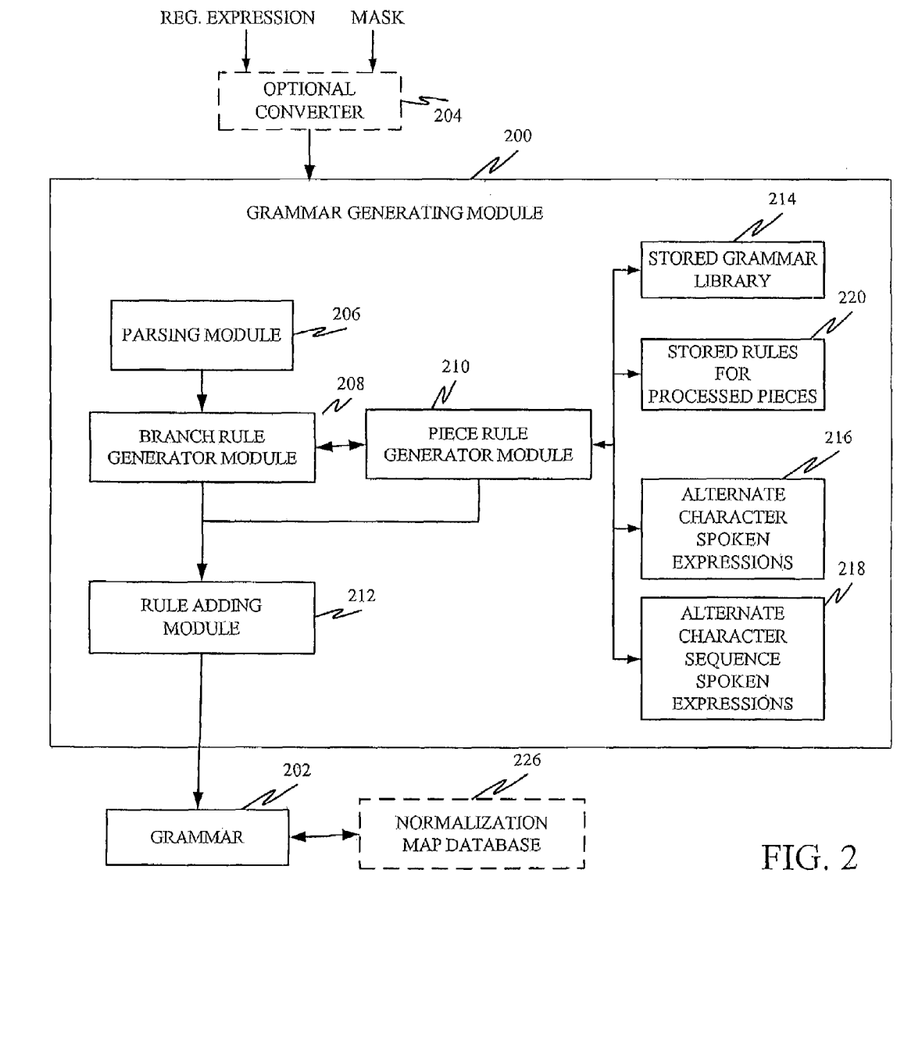
FIG. 2 is a block diagram schematically illustrating a system for generating a grammar based on a representation of an alphanumeric concept or expression.

FIG. 2 illustrates a grammar generating module 200 operable for instance on any of the forms of operating environments discussed above. Generally, the grammar generating module 200 receives a representation indicative of the types of alphanumeric concepts or expressions to be recognized. The representation generally specifies the characters and their location relative to each other that the alphanumeric expression to be recognized can include. Stated another way, the representation specifies the constraints for the alphanumeric expression to be recognized. The representation can take many forms to represent this information such as but not limited to "regular expressions", for instance as defined by the W3C in "XML Schema Part 2: Datatypes W3C Recommendation 02 May 2001" available at www.w3.org/TR/xmlschema-2/, which will be used by way of example below. In another form, the representation can take the form of a "mask", which allows the user to specifically define a pattern for the alphanumeric expression to be recognized.

Grammar generating module 200 receives the representation and processes the representation to create a grammar 202 adapted to recognize the desired alphanumeric expressions. Grammar generating module 200 can be adapted to process one or many forms of representations. However, in view of the generally well-defined form alphanumeric expressions to be recognized can take, it is possible to use an optional converter 204 that accepts one of more forms of representations and converts all forms of representations to a single form that is designed to be received by grammar generating module 200.

By way of example, grammar generating module 200 will be described as processing regular expressions as defined by W3C. A brief review of this standard may be helpful. W3C standard has the following formal definition for regular expressions:

```
regExp ::= branch ( '|' branch )*
branch ::= pieces*
piece ::= atom quantifier?
atom ::= char|charClass|('(' regExp ')')
```

According to this definition, a regular expression consists of one or multiple alternates (branches), where alternates are delimited by "|". Each branch consists of a sequence of pieces. Each piece is an atom that is optionally quantified. The quantifier specifies the repetition of the atom. It can be a number (e.g. {3}), a number range (e.g. {0-3}) or a reserved character (e.g. '+' for more than once, or '*' for zero or more times). The atom can be a character, a character class (e.g. [A-Z] for all uppercase letters, or \d for the ten digits [0-9]), or recursively a parenthesized regular expression.

It should be noted a regular expression with recursive regular expression atoms can be converted to one without the recursive atoms. For example, "(\d{3}|[A-Z]){2}C" defines the same language as "\d{3}[A-Z]C|\d{6}C|[A-Z]\d{3}C|[A-Z]{2}C" does. The algorithm discussed below processes regular expressions without recursive regular expression atoms; thus if recursive regular expression are present in the representation suitable conversion would be necessary.

Also, for purposes of the present description, but not for use in the conversion algorithm below, "branches" and "pieces" will also apply to processing of representations in the form of a mask. For instance, assume a mask for a parts number is of the form "&##-###-&&&", where "&" represents any characters of the set {A-Z} and "#" represents any of the digits {0-9}, then the "pieces" include "&##", "###" and "&&&", while the "atoms" include any "&", "#" or "-".

Conversion Algorithm

The following pseudo-code is an exemplary embodiment for processing a representation (herein a regular expression, "regexp") to obtain a grammar "gram" adapted for recognition of desired alphanumeric expression defined by regexp. The modules contained in the pseudo-code and their corresponding representation in FIG. 2 should not be considered limiting. Both the pseudo-code and the block diagram of FIG. 2 are provided in part for explaining processing concepts, the form of which should not be considered limiting. As appreciated by those skilled in the art, processing can be performed using different steps or a change of order without affecting the end result. In addition, processing performed by the modules of FIG. 2 can be separated in to other modules and/or combined with the modules shown or yet other modules without departing from aspects of the present invention.

TABLE 1

```
Line
Num.
 1. create_regexp_grammar(regexp, gram) {
 2.   foreach branch in (regexp.branches( )) {
 3.     string symbol =
 4.       create_branch_grammar(branch, gram);
 5.     rule_token token(symbol,1,1);
 6.     array RHS = (token);
 7.     gram.add_rule(gram.root( ), RHS);
 8.   }
 9. }
10.   create_branch_grammar(branch, gram) {
11.     array RHS = ( );
12.     foreach piece in (branch.pieces( )) {
13.       string symbol =
14.         create_piece_grammar(piece, gram);
15.       rule_token token(symbol,1,1);
16.       RHS.add(token);
17.     }
18.     string LHS=new_symbol( );
19.     gram.add_rule(LHS, RHS);
20.     return LHS;
21.   }
22.   create_piece_grammar(piece, gram) {
23.     atom unit = piece.atom( );
24.     pair (min, max) = piece.quantity( );
25.     set charset = unit.CharSet( );
26.     if (charset == {0, ..., 9}) {
27.       string LHS=new_symbol( );
28.       for (int i=min; i<=max; i++) {
29.         string ref = ruleref(lib, digit_i);
30.         array RHS=(rule_token(ref, 1, 1));
31.         gram.add_rule(LHS, RHS);
32.       }
33.       return LHS;
34.     }
35.     else {
36.       string charset_nt =
37.         create_charset_grammar(charset,gram);
38.       return
39.         create_repeats(charset_nt, min, max);
40.     }
41.   }
42.   create_repeats(symbol, min, max) {
43.     if (hash[symbol, min, max] != null)
44.       return hash(symbol, min, max);
45.     string LHS = new_symbol( );
46.     hash[symbol, min, max] = LHS;
47.     array RHS=( );
48.     if (min == 0) {
49.       rule_token token(symbol, 0, 0);
50.       RHS.add(token);
51.       gram.add_rule(LHS, RHS);
52.     }
```

TABLE 1-continued

```
53.     if (max <= 0) return LHS
54.     rule_token token(symbol, 1, 1);
55.     RHS = (token);
56.     if (min <= 1)
57.       gram.add_rule(LHS, RHS);
58.     if (max >= 2) {
59.       string rest1=
60.         create_repeats(symbol, min-1, max-1);
61.       rule_token rest1_token(rest1, 1, 1);
62.       RHS.add(rest1_token);
63.       gram.add_rule(LHS, RHS);
64.       RHS = (rule_token("double", 1, 1));
65.       RHS.add(token);
66.       string rest2=
67.         create_repeats(symbol, min-2, max-2);
68.       rule_token rest2_token(rest2, 1, 1);
69.       RHS.add(rest2_token);
70.       gram.add_rule(LHS, RHS);
71.     }
72.     if (max >= 3) {
73.       RHS = (rule_token("triple", 1, 1));
74.       RHS.add(token);
75.       string rest3=
76.         create_repeats(symbol, min-3, max-3);
77.       rule_token rest3_token(rest3, 1, 1);
78.       RHS.add(rest2_token);
79.       gram.add_rule(LHS, RHS);
80.     }
81.     return LHS;
82.   }
83.   create_charset_grammar(charset,gram) {
84.     string LHS=new_symbol( );
85.     array RHS=( );
86.     foreach ch in (charset) {
87.       switch (ch) {
88.         case '0':   RHS=(rule_token("zero",1,1));
89.                     gram.add_rule(LHS, RHS);
90.                     RHS=(rule_token("oh",1,1));
91.                     gram.add_rule(LHS, RHS);
92.                     break;
93.         case '1':   ......
94.       }
95.     return LHS;
96.   }
```

It should be noted, the pseudo-code provided above assumes that the regular expression parsing module 206 have the methods to access their components. For example, the method branches( ) returns the list of branches in the regular expression, while the method pieces( ) returns the list of pieces in branch, a branch in a regular expression. It also represents the right hand side of a rule as an array of rule_token's. Each rule_token is a tuple (symbol, min, max) that specifies that symbol repeats from min to max times in the rewriting rule.

Figure 3:
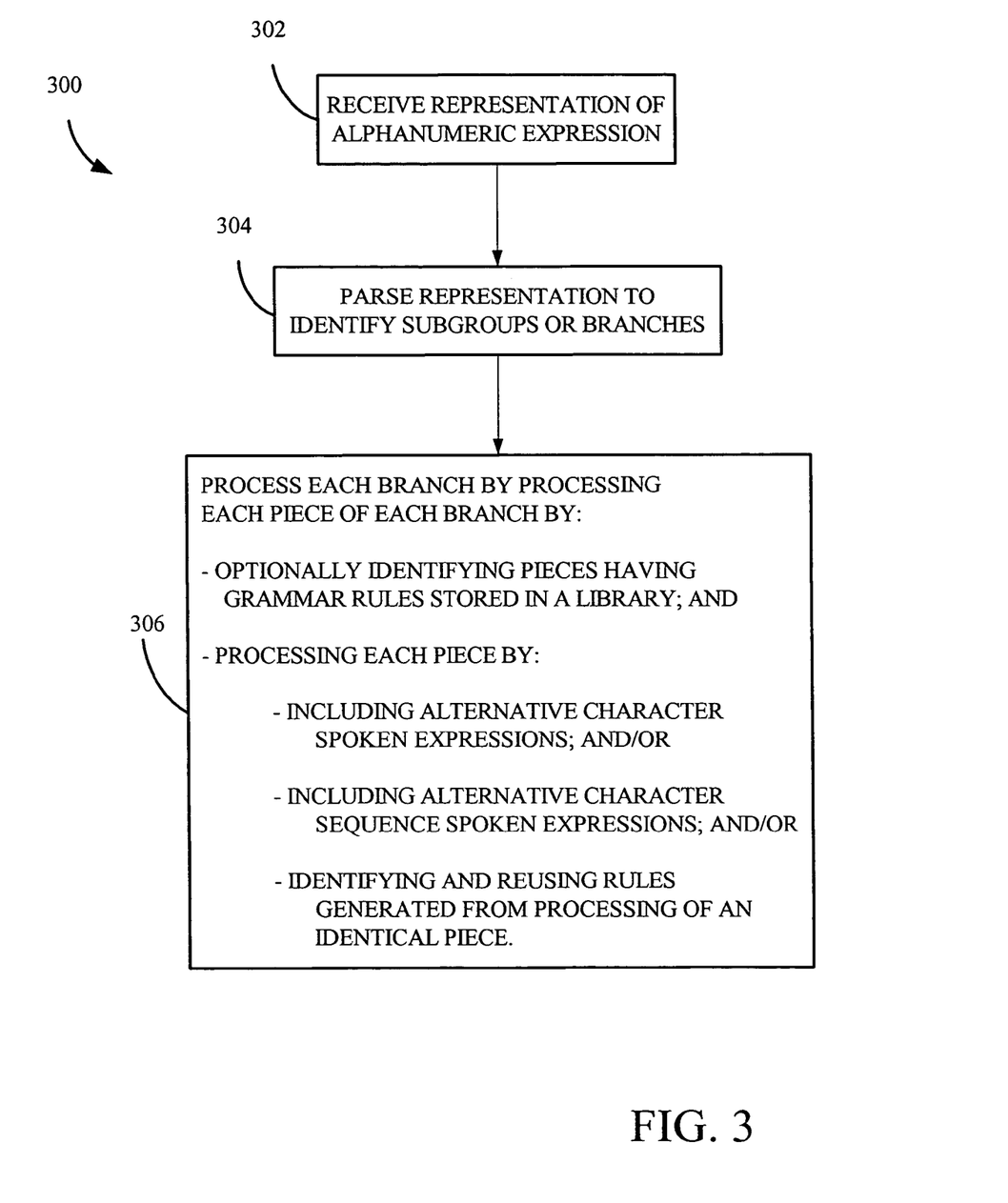
FIG. 3 is a flow diagram for creating a grammar.

Referring also to FIG. 3 which illustrates a method 300 for processing a representation, processing begins at step 302 with receipt of the representation by grammar generating module 200. The representation is then parsed by a parsing module 206 to identify subgroups (i.e., branches) of the representation at step 304. Commonly branches are determined by separating characters such as "|".

With the branches identified, in the exemplary embodiment, each of the branches is processed to generate rules for the grammar 202, wherein each piece of each branch in particular is processed. This step is represented in FIG. 3 at 306, while branch processing is provided by branch rule generator module 208 and piece processing is provided by piece rule generator module 210 in FIG. 2. Stated in yet broader terminology, branch rule generator module 208 generates alternative rules for an identified branch of the representation, while piece rule generator 210 generates rules for smaller portions (pieces) of each of the first-mentioned branches. Commonly the regular expression parsing module identifies the pieces separated by the delimiter "-", "/", blank spaces, etc.

In FIG. 2, processing results from branch rule generator module 208 and piece rule generator module 210 are provided to a rule adding module 212 that adds rules to the grammar 202.

With reference to the conversion algorithm above, the first (main) function create_regexp_grammar (lines 1-9) calls the second function create_branch_grammar (lines 10-21) to create the rules for each branch of the input regular expression, and adds rules that rewrite the root symbol to the "symbols" (generated by the algorithm) for the branches. The second function create_branch_grammar calls the third function create_piece_grammar (lines 22-41) to create the rules for each piece in a branch, and adds the rule that rewrites the branch symbol to the piece sequence (i.e, concatenates the pieces together). It should be noted that if a representation includes a "-", or other character used as piece delimiters, it too is considered piece, and in particular, typically an optional piece when the pieces are concatenated together. Thus for a parts number comprising "AXD-134", a user might say "A X D dash one two three" or "A X D one two three;" (i.e. no dash is spoken), but the grammar will consider the utterances equivalent. In should be noted characters such as dashes, slashes, etc. are embodied in the grammar rules as optional.

The third function create_piece_grammar creates the rules for a piece. Rules are added by the function gram.add.rule (LHS, RHS), where LHS and RHS denote the left-hand and right-hand sides of a rule.

Piece processing can optionally take advantage of some similarities that might exist in many forms of alphanumeric expressions. For instance, recognition of the spoken variations of a sequence of one or more digits is well-understood. Thus for a parts number comprising "AXD-134", a user might say "A X D one three four", "A X D one thirty four", "A X D one hundred and thirty four", etc. The number sequence or digit set "134", represented as a piece in a regular expression as "\d3" can then be identified by piece rule generating module 210, and wherein piece rule generating module 210 accesses a stored library 214 of grammar rules to obtain the grammar rules used to recognize that type of digit set. The stored library 214 can also include grammar rules for recognizing digit sets of optional length defined, for example, by a range such as "\d{1-3}". The stored library 214 is not limited to grammar rules for digit sets; however, they may be the most common. In the conversion algorithm, lines 26-34 identify and process digit sets by obtaining rules from the library.

If piece processing does not identify pieces having stored grammar rules in a library, or the piece being processed is not of the type having stored grammar rules in library 214, features of the piece are then identified in order to provide a rich set of grammar rules for the piece. In the conversion algorithm, this processing is controlled at lines 36-41.

Using by way of example a piece regular expression "[A-C]{1-3}", piece rule generating module 210 can identify individual characters in the piece and generate corresponding rules. However, in addition, piece rule generating module can identify appropriate alternative spoken expressions for each of the characters and include a corresponding rule in the grammar 202 for each of the alternative character spoken expressions. In the conversion algorithm, the function create_charset_grammar called at lines 36-37 and specified at lines 83-96 creates grammar rules that covers all the elements of the character set, where all character expressions for each character are defined in "case" statements of which "case '0'" is provided by way of example.

As indicated at lines 88-92, a rule is added to the grammar for pronunciation of "0" as "zero" as well as "oh". Another example not shown would provide grammar rules for pronunciation of the character "A" as "a" or "alpha". In FIG. 2, the data associated with alternative character spoken expressions is indicated at 216, and could be stored in a library or encoded in piece rule generating module 210.

In addition to identifying and generating rules for alternative character spoken expressions as discussed above, piece rule generating module 210 can also identify alternative character sequence spoken expressions. Using the example above "[A-C]{1-3}", besides expressions such as "A B", "A", "A B C", a user may provide "double A" for "AA", or "triple B" for "BBB". In the conversion algorithm, the function create-repeats defined at lines 42-82 and called initially at line 39, and recursively, if necessary, depending on the piece expression, creates the prefixed grammar rules for 0 time occurrence (line 48-52); one time occurrence (line 54-57); more than one occurrence (line 58-80) - - - note how it models the expressions like "double zero" in line 64-70; and more than two occurrences (line 72-80). Of course, other variations of alternative character sequence spoken expressions such "quadruple" or any other spoken expression for a sequence of characters can be included. In FIG. 2, the data associated with alternative character sequence spoken expressions is indicated at 218, and could be stored in a library or encoded in piece rule generating module 210.

In some alphanumeric expressions there exist some pieces that are identical. If the pieces correspond to those having stored grammar rule sets as found in stored grammar library 214 such as digit sets they can be added to the grammar 202. However, even if the piece does not correspond to grammar rules in library 214, the pieces can be identical within the representation. For instance, in the representation "[A-Z]{1-2}-\d{2}-[A-Z]{1-2}", piece "[A-Z]{1-2}" is present twice. Therefore, in a further embodiment, piece rule generator module 210 is adapted to identify pieces that are identical and use grammar rules generated from an earlier processing of that piece so as not to have to repeat generation of the rules for the piece again. In the conversion algorithm, a hash table (lines 43-46) is used as a mechanism to keep track of each of the piece portions as the representation is processed although other mechanisms can be used. If during further processing of the representation, an identical piece is encountered the earlier generated rules can then be copied. In FIG. 2, this aspect is represented by library 220 which stores rules for processed piece portions.

As indicated above, generation of recognition rules of the grammar 202 includes generation of grammar rules for alternative spoken expressions like "zero" and "oh" for "0", "double A" for "AA" and "twenty three" for "23". In a further embodiment, normalization is also provided such that the output from the speech recognizer is consistent so that an application receiving the output from the speech recognizer does not have to discern that "AA" and "double A" are equivalent.

In a first embodiment, normalization can be provided during encoding or writing of the rules for grammar 202. In particular, since piece rule generating module 210 is preferably encoded so as to identify alternative character spoken expressions and alternative character sequence spoken expressions when processing a piece to generate rules, it can provide the normalization information in grammar 202 as appropriate. By way of example, if grammar 202 is to be written in the W3C Speech Recognition Grammar Specification (SRGS) format using XML semantic interpretation tags, the tags in the grammar provide normalization. By way of example, the rules for recognition of "AA" written in the W3C SRGS Format can take the form of:

```
<rule id="S2">
    <one-of>
        <item>A A
            <tag>$=AA</tag>
        </item>
        <item>double A
            <tag>$=AA</tag>
        </item>
    </one-of>
</rule>
``` where "<tag>$=AA</tag>" indicates the normalized output. Although not specifically shown in the conversion algorithm, the algorithm can attach semantic interpretation tags to the rule tokens as they are generated so that recognition outputs obtained based on the grammar are appropriately normalized. Although normalization has been illustrated above for a sequence of characters, normalization for single characters as well as for digit sequences can be provided in a similar manner.

In the illustrative embodiment of FIG. 2, grammar rules for digit sets or sequences were developed and stored in library 214. Accordingly, normalization for digit sets or other pieces can also be stored with the grammar rules.

In an alternative embodiment, normalization rules could be stored separately from grammar 202. For instance, normalization can be provided by storing normalization mappings (e.g. "A A" "AA"; "double A" "AA") in a normalization map database 226 associated with grammar 202. The appropriate normalized mappings are provided by piece rule generator module 210 during piece processing, or appropriate mappings can be obtained from library 214 for corresponding stored grammar rules such as for digit sets. In this form of normalization, the grammar indicates the actual utterance of the user such as "double A"; however, before the speech recognizer returns this result, it checks to see if a normalized form exists for this result and replaces the result with a normalized result if it exists. Although implementation or operation of the speech recognizer may vary between each of these techniques, the developer need only provide a representation of the alphanumeric expression and then the system accounts for alternative spoken expressions that can be appropriately normalized to the format specified by the representation provided by the developer.

Figure 4A:
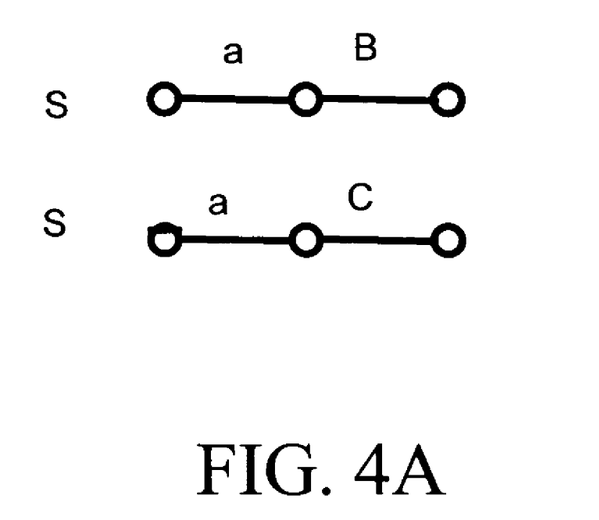
FIG. 4A is a pictorial representation of a portion of a grammar that is not prefix optimized.

In one embodiment, grammar 202 is created with prefix optimization. This provides a grammar that works efficiently with a speech recognizer by minimizing alternative hypotheses during recognition. Without prefix optimization, a grammar could include separate rules, which are also pictorially illustrated in FIG. 4A:

S→aB
S→aC

However, as indicated above, if the speech recognizer recognizes "a", it then must consider two hypotheses "aB" and "aC".

In contrast, in a prefix optimized grammar, the rules would be of the form below and illustrated in FIG. 4B:

S→aD
D→B
D→C

Thus, upon recognition of "a", the speech recognizer need only consider one hypothesis, "aD".

Figure 4B:
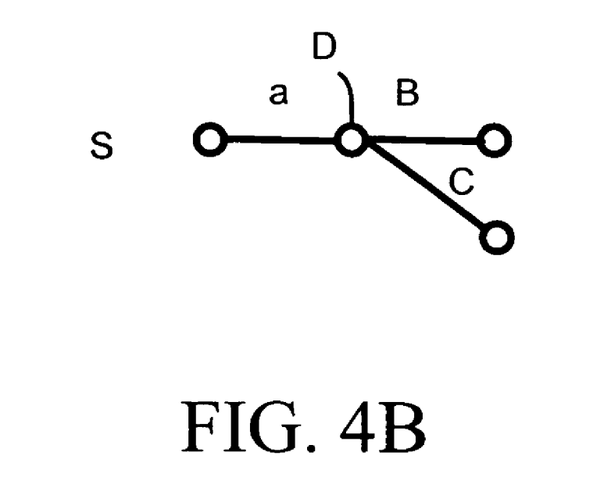
FIG. 4B is a pictorial representation of a portion of a prefix optimized grammar.

In the conversion algorithm above, rules forming the grammar are stored as a prefix tree (e.g. in the form represented by the pictorial representation of FIG. 4B) with the top node comprising the left-hand side "LHS" and the other nodes stored as an array forming the right-hand side "RHS". In this manner, when rules like those in FIG. 4A) are added to the grammar, prefix optimization has already been implemented with the prefix tree in FIG. 4B). In the conversion algorithm, the function gram.add.rule( ) adds or appends each of the rules to the grammar, which is represented in FIG. 2 by rule adding module 212. If as in the conversion algorithm, rules are initially stored as prefix trees, appropriate conversion to any form of grammar such as W3C SRGS Format using XML can be also implemented by rule adding module 212.

In summary, aspects of the invention allow high quality speech recognition grammars to be constructed automatically for alphanumeric concepts from appropriate representations such as regular expressions or masks. Automatic grammar creation relieves developers from the difficult task of creating a grammar that works efficiently and accurately for application specific alphanumeric concepts. Further features allow the grammar created to be optimized by using prefix structures and/or provide normalization, for instance, by assigning appropriate semantic interpretation tags. In this manner, the method and system described herein greatly speeds up the grammar development for developers with little speech recognition grammar authoring experience.

Although the present invention has been described with reference to particular embodiments, workers skilled in the art will recognize that changes may be made in form and detail without departing from the spirit and scope of the invention.

What is claimed is:

1. A computer implemented method to generate a grammar adapted for use by a speech recognizer, the method comprising:

parsing by a computer a representation of an alphanumeric expression into a plurality of branches, wherein the representation is distinct from the alphanumeric expression and specifies one or more characters and a location of the one or more characters relative to each other in the alphanumeric expression, wherein the representation is of the form of a regular expression as defined by W3C;

generating grammar rules for each of the plurality of branches; and identifying one or more smaller portions of each of the branches and generating grammar rules for each of the smaller portions, wherein generating grammar rules for each of the smaller portions comprises generating grammar rules for at least one of alternative character spoken expressions and alternative character sequence spoken expressions for the smaller portions.

2. The computer implemented method of claim 1 wherein the generating the grammar rules for alternative character spoken expressions includes using a mechanism to provide a normalized output from a speech recognizer for recognition of alternative character spoken expressions.

3. The computer implemented method of claim 2 wherein generating the grammar includes providing normalization information in the grammar so as to provide a normalized output from a speech recognizer for recognition of alternative character spoken expressions.

4. The computer implemented method of claim 3 wherein generating the grammar includes generating a database associated with the grammar, the database having normalization information.

5. The computer implemented method of claim 1 wherein the generating the grammar rules for alternative character sequence spoken expressions includes using a mechanism to provide a normalized output from a speech recognizer for recognition of alternative character sequence spoken expressions.

6. The computer implemented method of claim 5 wherein generating the grammar includes providing normalization information in the grammar so as to provide a normalized output from a speech recognizer for recognition of alternative character sequence spoken expressions.

7. The computer implemented method of claim 6 wherein generating the grammar includes generating a database associated with the grammar, the database having normalization information.

8. The computer implemented method of claim 1 wherein generating grammar rules for each of the smaller portions includes identifying a first smaller portion that is identical to a second smaller portion in the representation that grammar rules have previously been based on and generating rules based on the first smaller portion by using the rules based on the second smaller portion.

9. The computer implemented method of claim 1 wherein generating the grammar rules includes generating prefix optimized grammar rules.

10. A computer readable storage medium having instructions operable on a computer to generate a grammar adapted for use by a speech recognizer, the instructions comprising:
    parsing a representation of an alphanumeric expression into a plurality of branches, wherein the representation is distinct from the alphanumeric expression and specifies one or more characters and a location of the one or more characters relative to each other in the alphanumeric expression, wherein the representation is of the form of a regular expression as defined by W3C; generating grammar rules for each of the plurality of branches; and
    identifying one or more smaller portions of each of the branches and generating grammar rules for each of the smaller portions, wherein generating grammar rules for each of the smaller portions comprises generating grammar rules for at least one of alternative character spoken expressions and alternative character sequence spoken expressions for the smaller portions.

11. The computer readable storage medium of claim 10 wherein the representation comprises a regular expression or a mask.

12. A computer system to generate a grammar adapted for use by a speech recognizer, the computer system comprising:
    one or more processing units comprising:
        a parsing module adapted to parse a representation of an alphanumeric expression into a plurality of branches, wherein the representation is distinct from the alphanumeric expression and specifies one or more characters and a location of the one or more characters relative to each other in the alphanumeric expression, wherein the representation is of a regular expression as defined by W3C; and
        a branch rule generator module adapted to generate rules for the grammar based on the branches; and
        a piece rule generator module adapted to identify pieces of each of the branches and generate rules for the grammar based on each of the pieces; and
    one or more memory units comprising:
        a library for storing grammar rules based on pieces and wherein the piece rule generator module is adapted to identify a piece of the representation corresponding to a piece having rules stored in the library, and wherein the piece rule generator module is adapted to generate rules for the grammar based on the rules in the library, and wherein the piece rule generator module is adapted to generate rules for the grammar based on at least one of alternative character spoken expressions and alternative character sequence spoken expressions for the piece.

13. The system of claim 12 wherein the piece rule generator module is adapted to store rules in the library for a first piece of the representation that has been processed, and wherein the piece rule generator module is adapted to identify a second piece of the representation that is identical to the first piece of the representation and generate rules for the second piece of the representation based on the rules in the library for the first piece of the representation.

14. The system of claim 13 wherein the piece rule generator module is adapted to provide normalization information in the grammar for at least one of alternative character spoken expressions and alternative character sequence spoken expressions.

15. The computer readable storage medium of claim 10 wherein the generating the grammar rules for alternative character spoken expressions includes using a mechanism to provide a normalized output from a speech recognizer for recognition of alternative character spoken expressions.

16. The computer readable storage medium of claim 15 wherein generating the grammar includes providing normalization information in the grammar so as to provide a normalized output from a speech recognizer for recognition of alternative character spoken expressions.

17. The computer readable storage medium of claim 16 wherein generating the grammar includes generating a database associated with the grammar, the database having normalization information.

18. The computer readable storage medium of claim 10 wherein the generating the grammar rules for alternative character sequence spoken expressions includes using a mechanism to provide a normalized output from a speech recognizer for recognition of alternative character sequence spoken expressions.

19. The computer readable storage medium of claim 18 wherein generating the grammar includes providing normalization information in the grammar so as to provide a normalized output from a speech recognizer for recognition of alternative character sequence spoken expressions.

20. The computer readable storage medium of claim 19 wherein generating the grammar includes generating a database associated with the grammar, the database having normalization information.

* * * * *